United States Patent [19]

McPherson et al.

[11] Patent Number: 5,437,333
[45] Date of Patent: Aug. 1, 1995

[54] ADJUSTABLE ROCK COLLECTING IMPLEMENT WITH GUARDS

[75] Inventors: Mac E. McPherson; Michael G. McPherson, both of Jamestown, N. Dak.; Kenneth L. Innocent, Sacramento, Calif.; Gary A. Parkos; Roger D. Noskas, both of Browerville, Minn.

[73] Assignee: Glenmac Inc., Jamestown, N. Dak.

[21] Appl. No.: 94,856

[22] Filed: Jul. 21, 1993

[51] Int. Cl.6 .......................................... A01D 33/04
[52] U.S. Cl. .................................. 171/19; 171/63; 172/254; 37/303
[58] Field of Search ................. 37/424, 426, 429, 303; 171/63, 67, 69, 73, 19; 172/784, 250, 254

[56] References Cited

U.S. PATENT DOCUMENTS

| | | | |
|---|---|---|---|
| 315,184 | 4/1885 | Taft | 172/784 |
| 523,134 | 7/1894 | Sullivan | 172/784 |
| 1,366,068 | 1/1921 | Doane | |
| 1,497,855 | 6/1924 | Joneson | |
| 1,568,439 | 1/1926 | Baxter | 172/784 |
| 2,222,840 | 9/1940 | Holmes | 37/136 |
| 2,781,623 | 2/1957 | Anderson | 171/63 |
| 2,787,876 | 4/1957 | Cole | 55/17 |
| 2,938,586 | 5/1960 | Gaffney | 171/63 |
| 2,971,587 | 2/1961 | Anderson | 171/63 |
| 3,117,631 | 1/1964 | Fahrenholz | 171/63 |
| 3,324,955 | 6/1967 | Perold | 172/136 |
| 3,332,222 | 7/1967 | Heinlein | 56/377 |
| 3,366,081 | 1/1968 | Geiss | 172/784 |
| 3,465,456 | 9/1969 | Meyer | 37/50 |
| 3,479,755 | 11/1969 | Schropp | 37/8 |
| 3,703,210 | 11/1972 | Williams et al. | 172/784 |
| 4,040,490 | 8/1977 | Anderson | 171/63 |
| 4,221,265 | 9/1980 | Pratt | 171/126 |
| 4,315,546 | 2/1982 | Fahrenholz | 171/65 |
| 4,440,235 | 4/1984 | Colistro | 171/63 |
| 4,496,003 | 1/1985 | Bynum | 171/63 |
| 4,516,639 | 5/1985 | Hammarlund et al. | 172/99 |
| 4,555,897 | 12/1985 | Degelman | 56/228 |
| 4,593,426 | 6/1986 | Chrisley | 171/63 |
| 5,024,280 | 6/1991 | Mork | 172/197 |
| 5,060,732 | 10/1991 | Baskett | 171/63 |
| 5,070,946 | 12/1991 | Herr et al. | 171/65 |
| 5,133,413 | 7/1992 | Baxter | 171/63 |

Primary Examiner—Dennis L. Taylor
Assistant Examiner—Victor Batson
Attorney, Agent, or Firm—Westman, Champlin & Kelly

[57] ABSTRACT

A rock rake fiber gathering into a row or a gathering area objectional rocks and debris from the ground where a first roller engages such rocks and debris and a deflector forms a gap therebetween through which only un-objectionable rocks and debris may pass. The adjustable rock rake having an actuator for adjusting the angle of the roller and deflector. The adjustable rock rake having guards about the end of the roller such that a gathering area is formed for the accumulation of rocks and debris. The guards being removable and storable upon the frame of the adjustable rock rake.

9 Claims, 3 Drawing Sheets

ADJUSTABLE ROCK COLLECTING IMPLEMENT WITH GUARDS

BACKGROUND OF THE INVENTION

The present invention relates generally to implements used in the collecting of rocks and other debris from the ground surface. More particularly, the present invention provides an implement which is convertible in that debris can be collected in either a row or a moving 3-sided gathering area.

Various implements for collecting debris have been known. Generally, the implement includes a chassis/frame, a hitch on the front end thereof to connect the implement to another vehicle of self-sufficient mobility, wheels for supporting the chassis, optional tines for loosening of the soil, a roller typically with longitudinal teeth, and drive means typically consisting of gears and a drive chain which connect with a drive shaft from the towing vehicle.

Various improvements have been made on the rock collecting implement including a conveyor belt and a collector as shown on the rock picker in the U.S. Pat. No. 4,221,265 to Pratt, and the addition of an auxiliary roller positioned above the main roller for prevention of spilling by rocks and debris over the main roller. This auxiliary roller concept is shown on a rock windrower in the U.S. Pat. No. 4,315,546 to Fahrenholz where it allows the user to form larger windrows but does not prohibit dirt and smaller, selected rocks or debris, from passing between the rollers.

Accordingly, it would be desirable to provide a rock collecting implement which continually gathers rocks and debris in a moving gathering area with side guards, but also is adjustable such that it may windrow them off to the side of the machine in a row, where that rock collecting implement would allow selected rocks and debris to return to the ground.

SUMMARY OF THE INVENTION

The invention is an improvement of a field implement for collecting rocks and debris off of the ground using a roller. The field implement has a frame which supports movement over the ground. A support frame is pivotally connected to the frame, where the support frame rotationally supports a ground engaging roller that rotates to gather debris from the ground. Also connected to the support frame is a deflecting bar for deflecting objectionable rocks and debris gathered by the ground engaging roller. Guards are positioned at opposite ends of the ground engaging roller for keeping debris in front of the ground engaging roller.

DETAILED DESCRIPTION OF THE PREFERRED EMBODIMENTS

Figure 1:
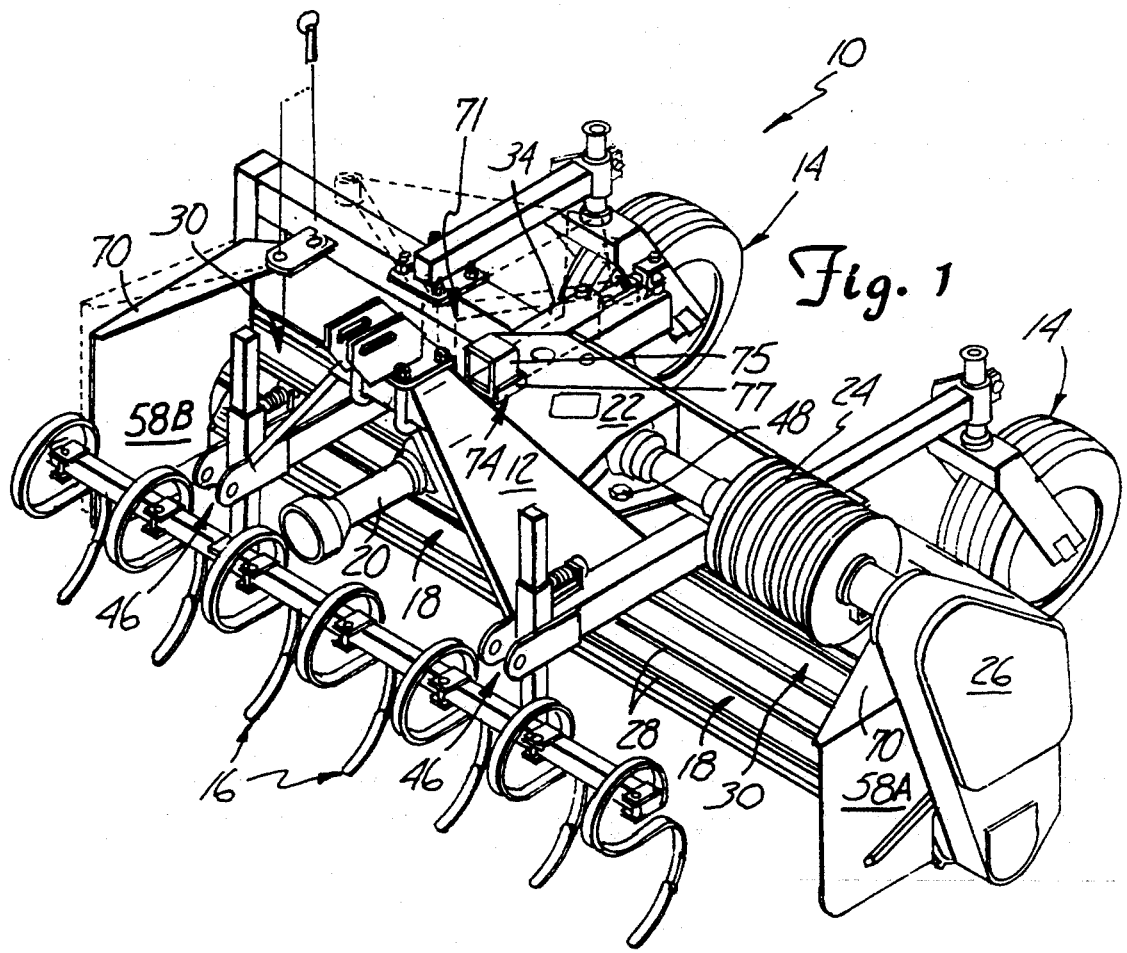
FIG. 1 is a perspective view of the implement of the present invention wherein dashed lines illustrate guards in a storage position and an adjustable guard in an outwardly adjusted position.
Figure 3:
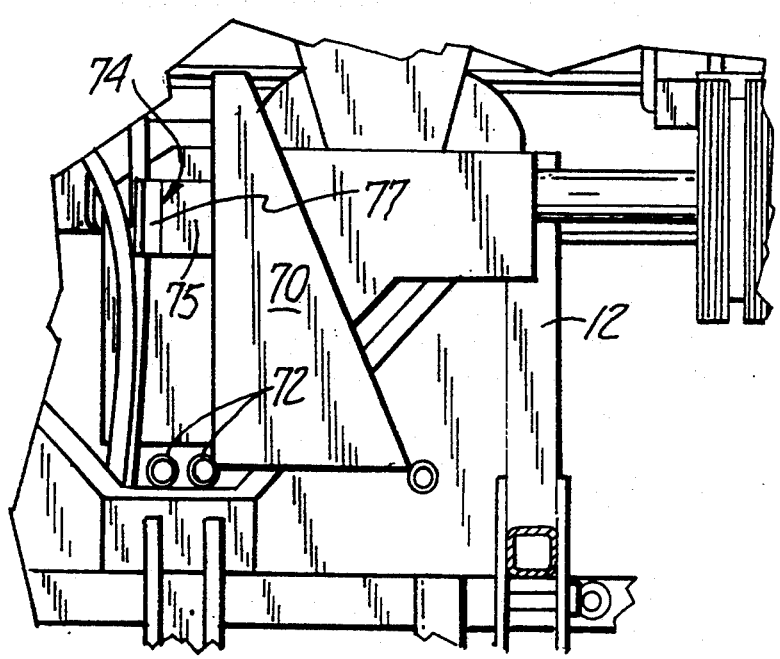
FIG. 3 is a sectional view of one guard in a storage position.

Referring to FIG. 1, an implement or rock rake of the present invention is illustrated generally at 10. A frame 12 is supported by and movable on two ground-engaging wheels 14. The frame in more detail comprises numerous supports which are necessary for the stability and the support of the rock collecting implement. Attached to the front of the frame 12 is a plurality of vertically adjustable tines 16 for penetrating and dislodging the soil such that rocks and debris may be separated therefrom. One skilled in the art will readily realize that the tines 16 are conventional and well known in the art and it is not believed necessary to describe them in further detail.

The frame 12, which supports the rock collecting implement 10, will be pulled or towed by a vehicle (not shown) across a field. The plurality of vertically adjustable tines 16 precede a ground-engaging roller 18 which is attached to the frame 12 and rotated to collect objectionable rocks and debris. Rotation of the ground-engaging roller 18 is caused by a drive shaft attachment 20, a gear box 22, a power take off shaft and clutch 24, and at least one roller attachment and drive arm or device 26 with a corresponding drive chain (not shown) connecting with the ground-engaging roller 18. The drive shaft (not shown) of the vehicle towing the rock rake engages the drive shaft attachment 20. This causes the rotation of the drive shaft attachment 20 which, via the gear box 22, a power take off shaft and clutch 24 and the drive chain, results in the rotation of the ground-engaging roller 18.

Proper rotation of the ground-engaging roller results in the rocks and debris being carried forward and upward, typically by bars or other longitudinal splines 28, toward a deflector 30. The deflector 30 is positioned in a manner such that a major planar surface thereof runs parallel to the ground-engaging roller 18. The ground-engaging roller 18 and deflector 30 act in unison in a vertical plane where the vertical plane is angularly adjustable with respect to movement of the rock collecting implement 10 in a selected path.

Figure 2:
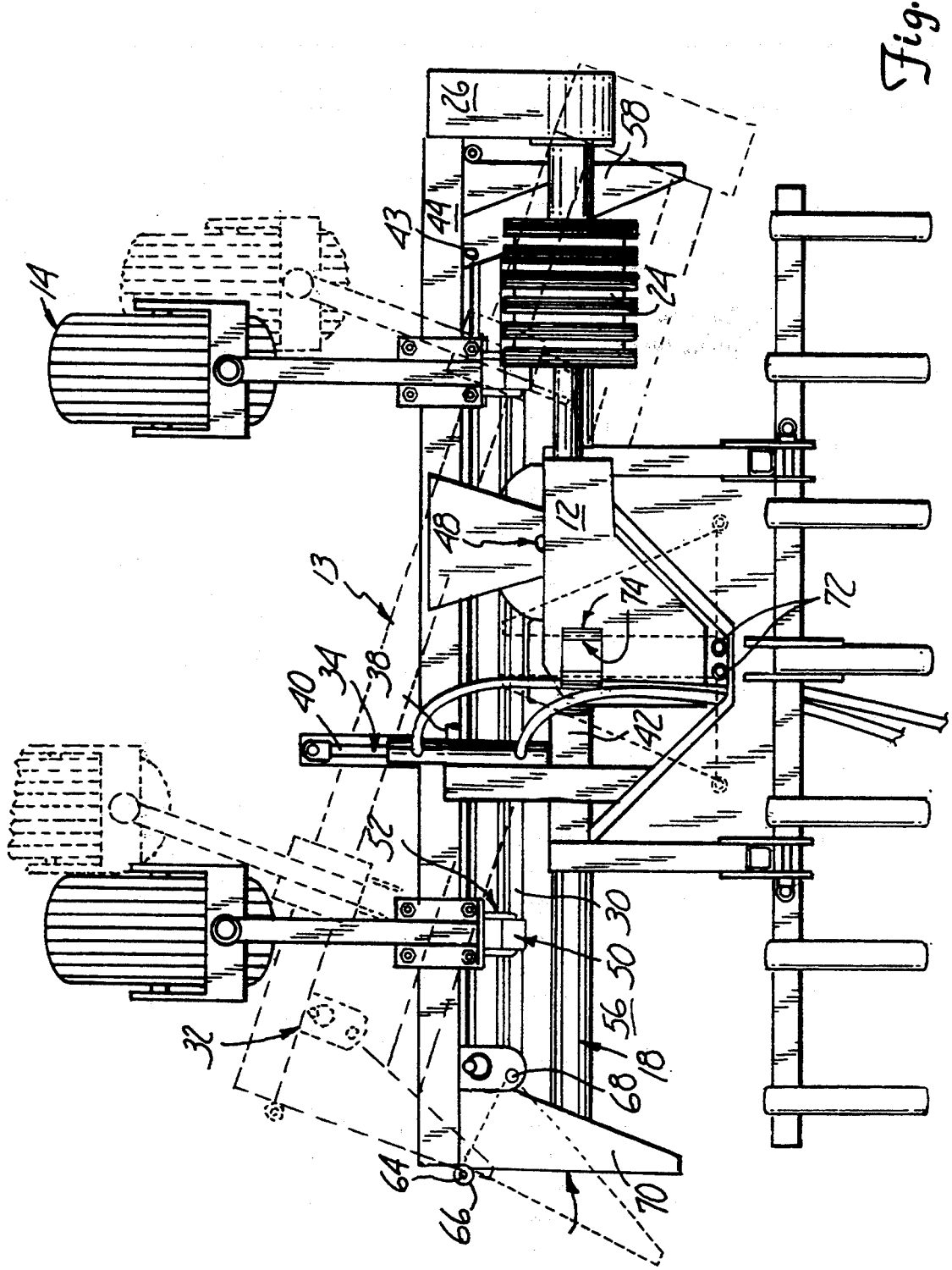
FIG. 2 is a top plan view of the implement wherein dashed lines illustrate the implement in an angled position.

Referring to FIG. 2, an angular adjustment mechanism 13 allows the rock collecting implement 10 to function as either a perpendicular rake or a windrower depending upon the position of the vertical plane. When the ground-engaging roller 18 and deflector 30 are positioned in a perpendicular manner with reference to the direction of motion of the frame, the rock collecting implement 10 generally keeps the debris ahead of the roller 18. When the ground-engaging roller 18 and deflector 30 are positioned in a diagonal manner with reference to the direction of motion of the frame 12, the rock collecting implement 10 functions as a windrower by shuffling rocks off to the rearmost side.

The angular adjustment mechanism 13 includes a hydraulic actuator 34 connected between a support frame 44 and the frame 12 and a fixed pivotal point 48 between the frame 12 and the support frame 44. A cylinder 34A of the hydraulic actuator 34 attaches to the frame at 38. The tines 16, a hitch 46, the drive shaft attachment 20, and a gear box 22 are attached to the frame 12. A piston rod 40 of the hydraulic actuator 34 attaches to the support frame 44 upon which the ground-engaging roller 18, the deflector 30, the wheels 14 and drive arm 26 are attached. The support frame 44 of the frame 12 is rotatable about the fixed pivotal point 48 on the frame 12 with extension and retraction of the piston rod 40 in the cylinder 34A thus allowing the angular adjustment of the ground-engaging roller 18 and the deflector 30. The ground-engaging wheels 14 are pivotally attached so that when the support frame 44 is rotated to a diagonal position, the wheels 14 accordingly pivot so that they still function properly.

Figure 4:
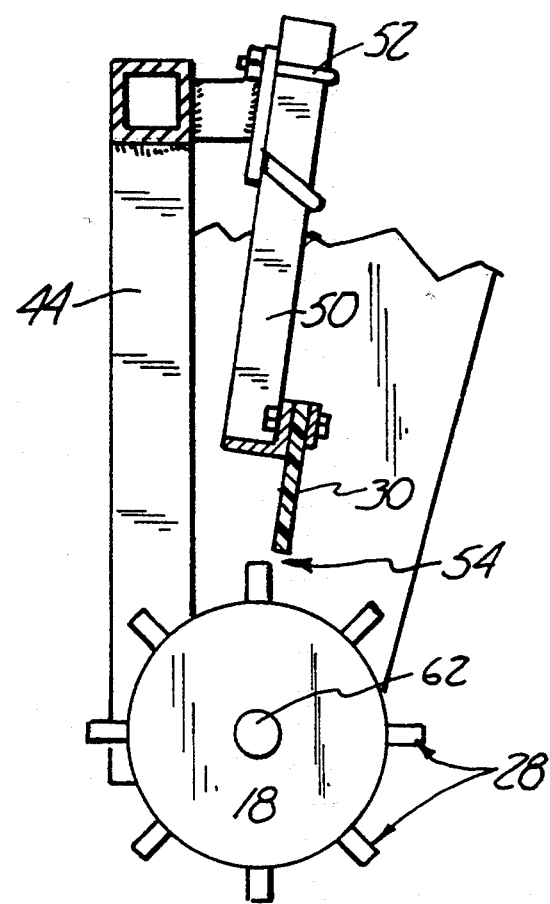
FIG. 4 is a sectional view of a gathering mechanism.

Referring to FIG. 4, the deflector 30, comprising a plate, is attached to the support frame 44 by two extension arms 50. Each extension arm 50 slides through two U-bolts 52 which are tightened down to the support frame 44 when the deflector 30 is optimally positioned. Between the deflector 30 and the ground-engaging roller 18 is a gap 54. The gap 54 allows selected sized rocks and debris to pass through and not be deflected, while the deflected rocks and debris fall forward and accumulate in front of the ground-engaging roller 18. The deflector 30 can be selectably positioned at a distance from the ground-engaging roller that the user finds as optimal by adjustment of the extension arms 50 using the U-bolts 52. Preferably, the deflector 30 is flexible.

The deflected rocks and debris which continue to fall forward and accumulate in front of the ground-engaging roller 18 may be gathered in a gathering area 56. The gathering area 56 is formed by the combination of the ground-engaging roller 18 and deflector 30 as a back side and two guards, more specifically a first guard 58A and a second guard 58B, as sides to the gathering area 56. Preferably, each of these guards 58A–58B attaches to the support frame 44 about its outer end where the ground-engaging roller 18 connects to the frame 12 using suitable bearings 62. Each of the guards 58A–58B attaches near an end of the ground-engaging roller with the first guard 58A attaching at the end near the drive chain, while the second guard 58B attaches at the opposite end of the support frame 44.

In more detail, each of the guards 58A–58B attaches to the support frame 44 using a set of pins 64 welded to each respective guard. Each pin 64 slides vertically down through suitable apertures of attachment cylinders 66 welded to the support frame 44 where each pin 64 rests with a lower portion in the cylinder 66 and an upper portion exposed where it is welded to the guard.

In the embodiment illustrated, the second guard 58B is movable while the first guard 58A is fixed. The drive device 26 as shown acts as a constraint to outward movement of the guard 58A; however, it is understood that the guard 58A and/or drive device 26 could be repositioned to allow a movable guard.

A fastener 68 cooperates with the upper flange 70 of the movable guard 58B to adjust its position. The fastener 68 has two adjustment positions such that the overall width of the gathered area of debris may be increased or decreased. A suitable fastener 43 cooperates with a flange from the support frame 44 to hold the guard 58A in place. The guards 58A–58B are easily removable by releasing the fasteners 68 and 43 and then lifting the pins 64 from the cylinders 66.

A storage system 71 is provided on the rock collecting implement 10 for storing the guards 58A–58B when not in use. Preferably, the storage system 71 is located on the frame 12. As illustrated, the storage system 71 includes a set of storage cylinders 72 located on the first portion 42 of the frame 12. Each guard 58A–58B is stored by inserting one of the pins 64 into one of the storage cylinders 72 such that a lower edge on each of the guards rests between two receiving guides 74. The receiving guides are formed by a space block 75 mounted in a larger upturned U-shape member 77. This ability to store the guards 58A–58B on the frame 12 is convenient and gives the operator the choice to use the guards as needed in the operation.

The improvement to rock collecting implements involves the addition of a deflector plate 30 which is adjustably fixed above the ground-engaging roller 18 at a selected gap 54. In addition, guards 58A–58B create a gathering area 56 in front of the ground-engaging roller 18 for collecting rocks and debris. The guards 58A–58B are both adjustable for increasing or decreasing the size of the gathering area 56, and removable for the alternative use of the rock rake as a windrower. The ground-engaging roller 18 and deflector act in unison in a vertical plane and are angularly adjustable such that the ground-engaging roller 18 may act as a rock rake where it is perpendicular to the direction the frame 12 is being pulled in or the ground-engaging roller 18 and deflector 30 may be angularly moved to a diagonal position such that the ground-engaging roller 18 acts as a windrower. This angular adjustment is accomplished by an actuator 34 that adjustably attaches the frame 12 to the support frame 44 upon which the roller 18 and deflector 30 is connected.

Although the present invention has been described with reference to preferred embodiments, workers skilled in the art will recognize that changes may be made in form and detail without departing from the spirit and scope of the invention.

What is claimed is:

1. A field implement for gathering debris on the ground, the field implement, comprising:
   a frame;
   a ground-engaging roller rotatably mounted to the frame, the ground-engaging roller rotating to gather debris from the ground;
   a pair of removable guard plates detachably secured to the frame wherein a guard plate is disposed at each end of the ground-engaging roller and wherein each guard plate includes a mounting pin; and
   a storage system secured to the frame for storing the pair of removable guard plates when not in use, the storage system including an aperture suitable for receiving the mounting pin of each guard plate and means receiving an edge of each plate therebetween.

2. The field implement of claim 1 and further comprising angle adjusting means for adjusting the selected angle of the gathering means relative to movement over the ground, the angle adjusting means being connected between the frame and the support frame.

3. The field implement of claim 1 wherein the frame comprises a first portion supported for movement over the ground, and a second portion pivotally connected to the first portion, wherein the ground-engaging roller and the guard plates are mounted to the second portion.

4. The field implement of claim 1 wherein the guard plates are adjustable for adjusting the width of debris gathered in front of the ground-engaging roller.

5. The field implement of claim 1 wherein the first guard plate is connected to the frame in a fixed position, and the second guard plate connected to the support frame in selectable positions.

6. A field implement for gathering debris on the ground, the field implement, comprising:
   a frame;

a ground-engaging roller rotatably mounted to the frame, the ground-engaging roller rotating to gather debris from the ground;

a removable guard plate detachably secured to the frame at an end of the ground-engaging roller and wherein the guard plate includes a mounting pin; and a storage system secured to the frame for storing the guard plate when not in use, the storage system including an aperture suitable for receiving the mounting pin of the guard plate and a set of spaced-apart surfaces for receiving an edge of the plate therebetween.

7. The field implement of claim 6 and further comprising a second removable guard plate detachably secured to the frame at an end of the ground-engaging roller opposite the first-mentioned guard plate, the second guard plate having a mounting pin; and wherein the storage system includes a second aperture suitable for receiving the mounting pin of the second guard plate and a second set of spaced-apart surfaces for receiving an edge of the plate therebetween.

8. The field implement of claim 7 wherein the storage system comprises a U-shaped member having first surface and a second surface facing the first surface, and a member secured to the U-shaped member between the first and second surfaces wherein the first-mentioned set of spaced-apart surfaces comprise the first surface and a surface of the member facing the first surface, and wherein the second set of spaced-apart surfaces comprise the second surface and a surface of the member facing the second surface.

9. The field implement of claim 8 wherein the frame comprises a first portion supported for movement over the ground, and a second portion pivotally connected to the first portion, wherein the ground-engaging roller and the guard plate are mounted to the second portion.

* * * * *

UNITED STATES PATENT AND TRADEMARK OFFICE
CERTIFICATE OF CORRECTION

PATENT NO. : 5,437,333
DATED : August 1, 1995
INVENTOR(S) : Mac E. McPherson et al.

It is certified that error appears in the above-indentified patent and that said Letters Patent is hereby corrected as shown below:

Item [57] Abstract, line 1, "fiber" should read

--for--

Signed and Sealed this

Twenty-seventh Day of February, 1996

Attest:

BRUCE LEHMAN

*Attesting Officer*   *Commissioner of Patents and Trademarks*